United States Patent
Yajima et al.

(10) Patent No.: US 8,994,234 B2
(45) Date of Patent: Mar. 31, 2015

(54) LINEAR ACTUATOR

(75) Inventors: Hisashi Yajima, Tsukuba (JP); Tatsuya Hosaka, Tsukubamirai (JP); Toshio Sato, Tsukuba (JP)

(73) Assignee: SMC Kabushiki Kaisha, Tokyo (JP)

( * ) Notice: Subject to any disclaimer, the term of this patent is extended or adjusted under 35 U.S.C. 154(b) by 367 days.

(21) Appl. No.: 13/291,583

(22) Filed: Nov. 8, 2011

(65) Prior Publication Data

US 2012/0119593 A1    May 17, 2012

(30) Foreign Application Priority Data

Nov. 15, 2010    (JP) ................................. 2010-254552

(51) Int. Cl.
| | |
|---|---|
| *H02K 41/02* | (2006.01) |
| *F16C 29/06* | (2006.01) |
| *F16C 29/00* | (2006.01) |
| *H02K 41/03* | (2006.01) |
| *F16C 29/12* | (2006.01) |
| *H02K 7/08* | (2006.01) |

(52) U.S. Cl.
CPC ............. *F16C 29/064* (2013.01); *F16C 29/007* (2013.01); *H02K 41/031* (2013.01); *F16C 29/12* (2013.01); *H02K 7/08* (2013.01)
USPC .......................................... 310/12.31; 310/90

(58) Field of Classification Search
USPC ........................................ 310/12.31, 90, 90.5
See application file for complete search history.

(56) References Cited

U.S. PATENT DOCUMENTS

| 5,825,104 | A  | * | 10/1998 | Kondo et al. | ............... 310/12.27 |
| 6,101,952 | A  |   | 8/2000 | Thornton et al. | |
| 6,665,053 | B2 | * | 12/2003 | Korenaga | .......................... 355/72 |
| 2004/0207270 | A1 | * | 10/2004 | Asou et al. | ...................... 310/12 |
| 2005/0200209 | A1 | * | 9/2005 | Kim et al. | ......................... 310/12 |
| 2006/0114090 | A1 | * | 6/2006 | Yajima et al. | .................. 335/229 |
| 2006/0117883 | A1 | * | 6/2006 | Yasuda et al. | ............. 74/388 PS |
| 2007/0170786 | A1 |   | 7/2007 | Miyamoto et al. | |

FOREIGN PATENT DOCUMENTS

| JP | 52-140087 | 11/1977 |
| JP | 61-4633 | 1/1986 |
| JP | 10-061611 | 3/1998 |
| JP | 2001-527380 | 12/2001 |
| JP | 2002-227839 | 8/2002 |

(Continued)

OTHER PUBLICATIONS

Japanese Office Action issued Jul. 22, 2014 in Japanese Patent Application No. 2010-254552 w/English translation.

*Primary Examiner* — Dang Le
(74) *Attorney, Agent, or Firm* — Oblon, McClelland, Maier & Neustadt, L.L.P.

(57) ABSTRACT

A linear actuator displaces a relative position between a guide rail and a slide table, which is arranged in confronting relation to the guide rail. Projections are formed on opposite end sides of the guide rail, the projections extending along a direction of displacement and projecting toward the slide table. The slide table is disposed between the projections on the opposite end sides of the guide rail, with rigid balls being interposed therebetween. Guide grooves and guide grooves, which rollably support the balls, are provided on the projections on the opposite end sides of the guide rail and on the slide table. The guide grooves and the guide grooves apply, on the balls, a pressure caused by a magnetic attractive force of permanent magnets.

9 Claims, 18 Drawing Sheets

(56) References Cited

FOREIGN PATENT DOCUMENTS

| | | |
|---|---|---|
| JP | 2005-269822 | 9/2005 |
| JP | 2006-114557 | 4/2006 |
| JP | 2010-161926 | 7/2010 |
| JP | 2014-013211 | 1/2014 |

* cited by examiner

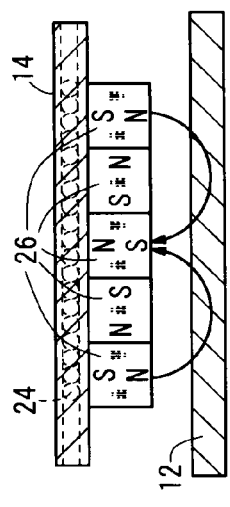
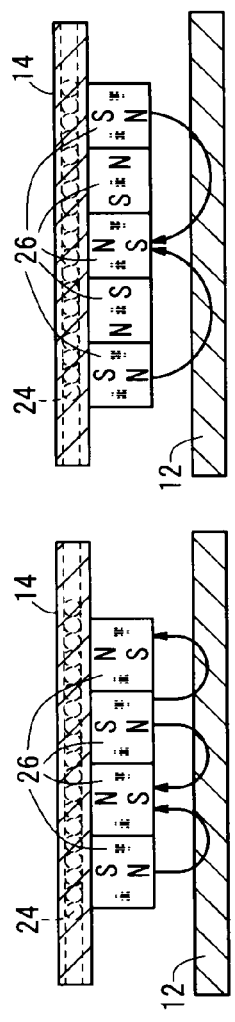
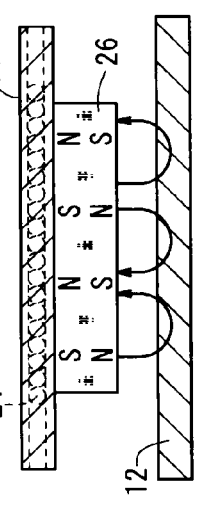
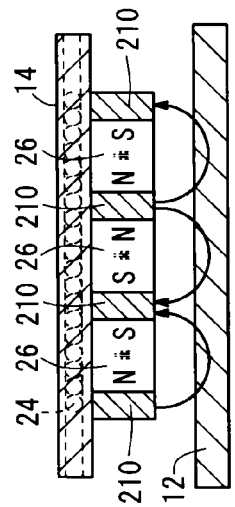
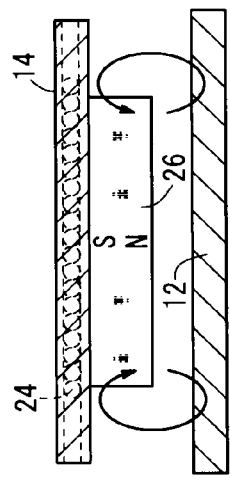
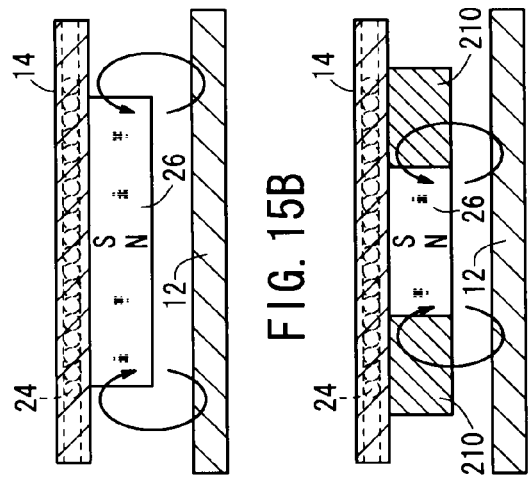
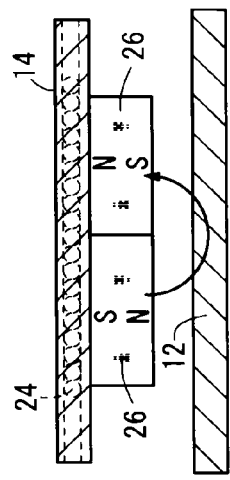

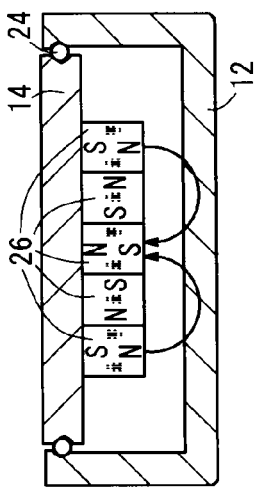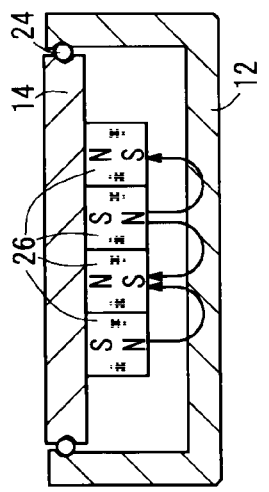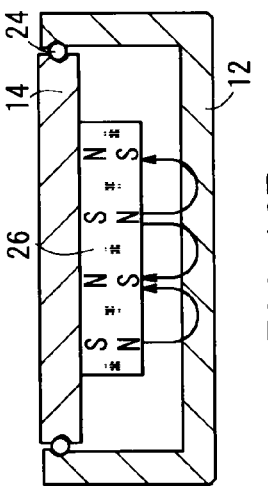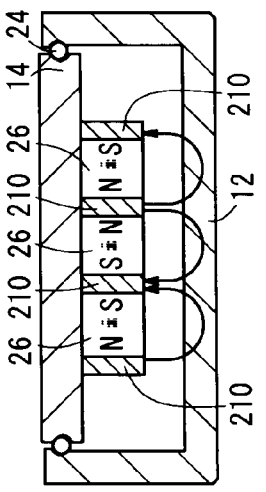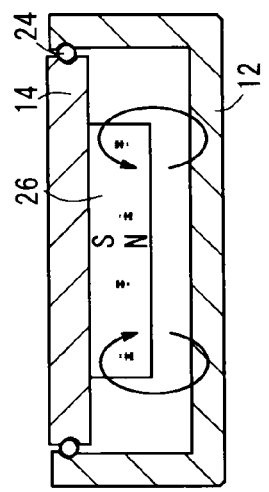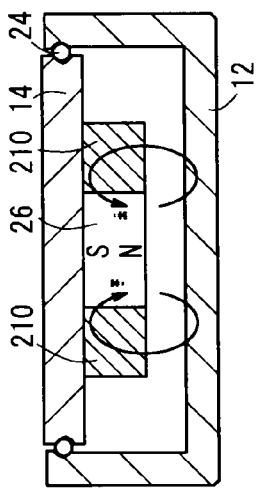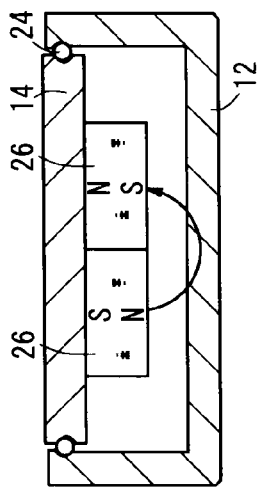

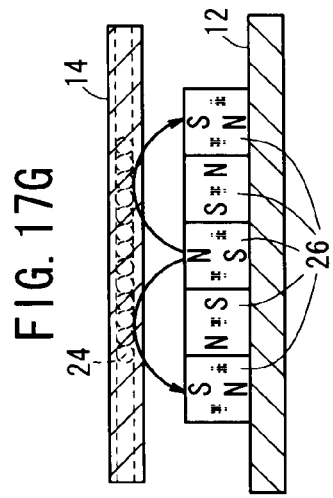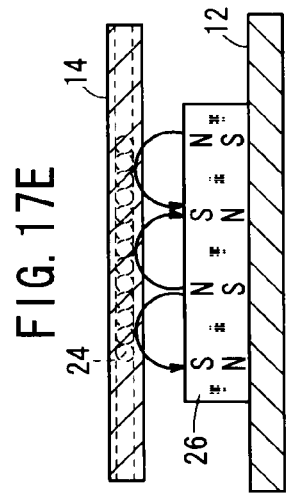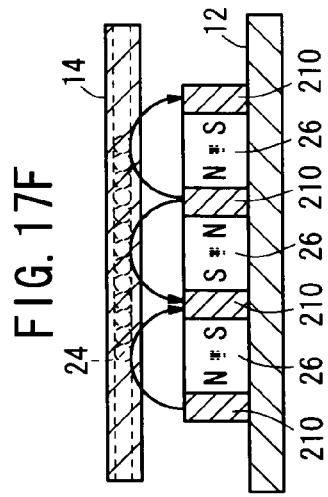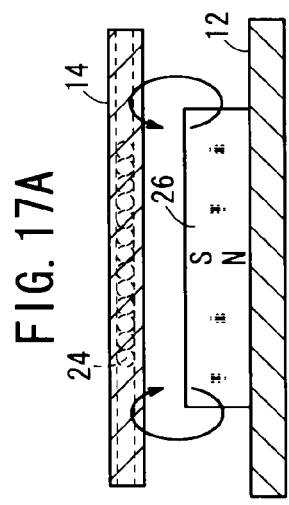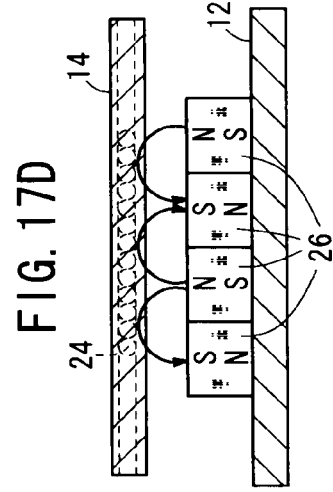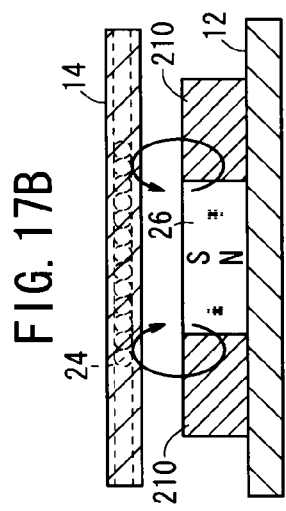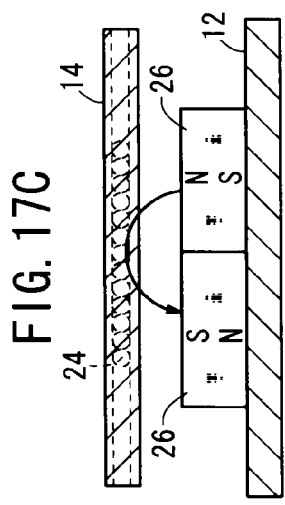

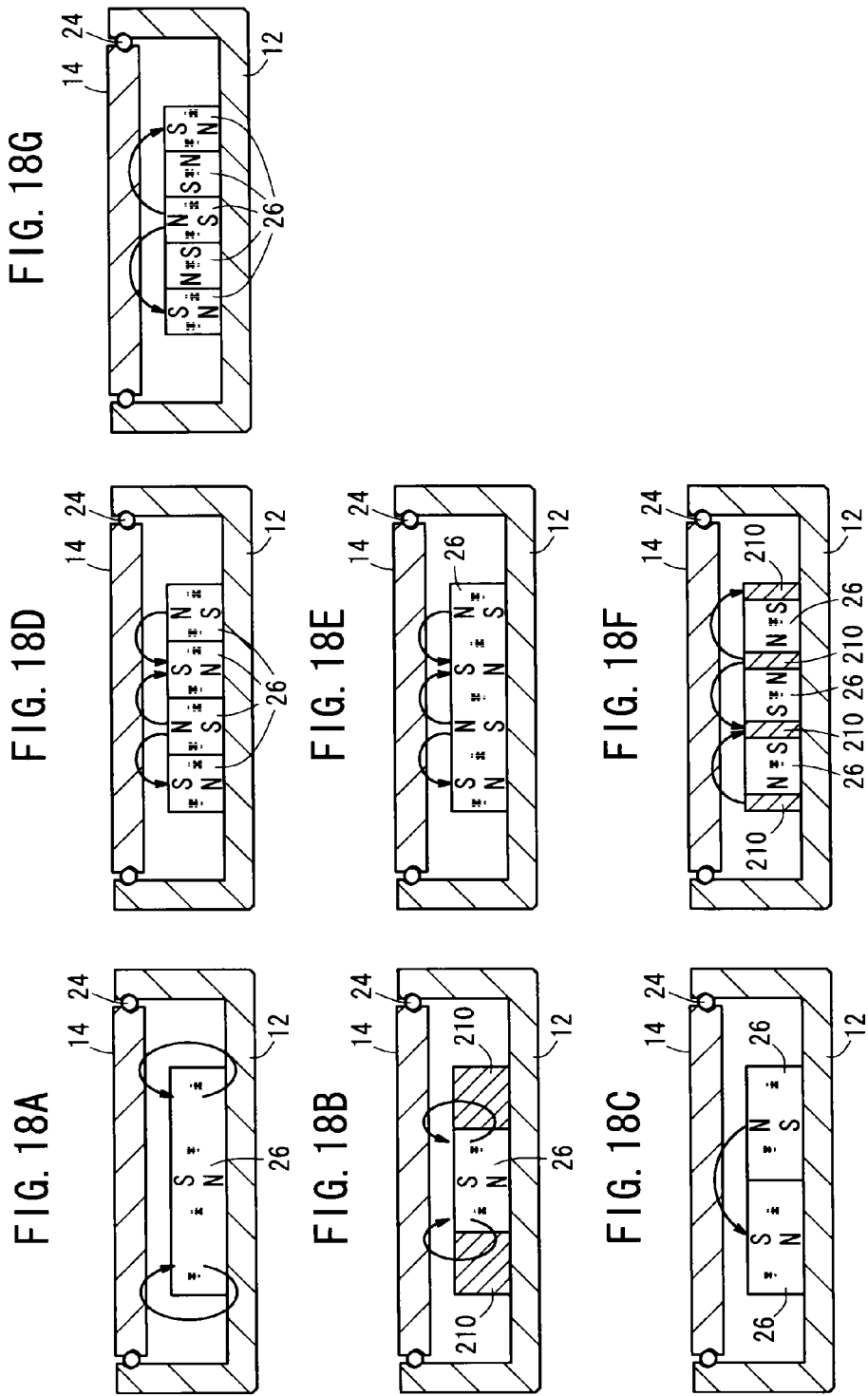

LINEAR ACTUATOR

CROSS-REFERENCE TO RELATED APPLICATION

This application is based upon and claims the benefit of priority from Japanese Patent Application No. 2010-254552 filed on Nov. 15, 2010, of which the contents are incorporated herein by reference.

BACKGROUND OF THE INVENTION

1. Field of the Invention

The present invention relates to a linear actuator for displacing a relative position between a first member and a second member, which is arranged in confronting relation to the first member, while preventing chattering/backlash from occurring between the first member and the second member.

2. Description of the Related Art

A linear actuator is known in which a relative position between a guide rail and a slide table, which is disposed to confront the guide rail, is displaced. As disclosed in Japanese Laid-Open Patent Publication No. 2010-161926, for enabling displacement of the guide rail and the slide table, for example, spherical shaped rolling bodies are interposed between the guide rail and a movable element to which the slide table is affixed. The rolling bodies are supported for rolling movement by two rows of guide grooves (rolling grooves) provided between the guide rail and the movable element. The rolling bodies are rollably supported by the guide grooves, which are constituted as gothic arches.

SUMMARY OF THE INVENTION

For preventing chattering/backlash between the guide rail (first member) and the movable element (second member), pre-compression is applied to the rolling bodies by making the diameter of the rolling bodies greater, for example, on the order of a few μm, than the contact diameter of the rolling bodies in the rolling grooves (i.e., the diameter of the rolling bodies when the rolling bodies are accommodated in the rolling grooves). For making the contact diameter of the rolling bodies in the rolling grooves smaller than the diameter of the rolling bodies, various techniques are used, such as (1) adjusting the shape of the rolling grooves of the guide rail and the movable element, (2) altering the combination of the guide rail and the movable element that is used, and (3) using rolling bodies that initially are larger in diameter than the aforementioned contact diameter.

However, using the above techniques, problems tend to occur in that, with the first technique (1), a high level of machining accuracy on the order of a few μm is required, with the second technique (2), a high level of assembly accuracy on the order of a few μm is required, and with the third technique (3), appropriate selection of the rolling bodies is difficult to perform. Further, in the case of supporting the rolling bodies in rolling grooves constructed in the form of two rows of gothic arches, it is necessary for the rolling grooves to be machined with high precision, and furthermore, a defect occurs in that differential slippage of the rolling bodies causes frictional forces to increase.

Further, in the case that rolling grooves having a circular structure are used, in which the supporting directions thereof are arranged at mutual right angles to support loads in two directions, although an advantage results in that differential slippage can be made smaller than with the aforementioned gothic arch structure, the structure becomes complex overall because four rows of rolling grooves are required, and miniaturization (reduction in scale) of the linear actuator is made more difficult.

The present invention has been made taking into consideration the problems of the conventional techniques discussed above, and has an object of providing a linear actuator in which, by means of a simple structure, chattering/backlash between a first member and a second member can be prevented, differential slippage of the rolling bodies can be suppressed, and miniaturization of the linear actuator can be facilitated.

To accomplish the aforementioned objectives, the present invention provides a linear actuator for displacing a relative position between a first member and a second member, which is arranged in confronting relation to the first member, wherein projections are formed on opposite end sides of the first member, the projections extending along a direction of displacement and projecting toward the second member, the second member is disposed between the projections on the opposite end sides of the first member, with rolling bodies that enable displacement of the relative position between the first member and the second member being interposed therebetween, first rolling grooves and second rolling grooves for rollably supporting the rolling bodies are provided on the projections on the opposite end sides of the first member and on the second member, and the first rolling grooves and the second rolling grooves apply a pressure on the rolling bodies, caused by a magnetic attractive force of a magnet that generates a bipolar magnetic field having two poles.

The magnets may be permanent magnets or electromagnets.

The diameter of the rolling bodies preferably may be smaller than a space formed between the first rolling grooves and the second rolling grooves.

The groove shape of at least one of the first rolling grooves and the second rolling grooves may be of an arcuate shape having a single radius of curvature.

The groove shape of at least one of the first rolling grooves and the second rolling grooves may be made up of a plurality of arcs each having its own radius of curvature.

The first member and the second member preferably may be magnetic bodies.

A coil may be disposed on either one of the first member and the second member, and the magnet may be disposed on a side of another one of the first member and the second member on which the coil is not disposed, such that a thrust force is generated by a current that flows in the coil to thereby displace the relative position between the first member and the second member.

A cylinder main body may be attached to one of the first member and the second member, and the magnet may be disposed on one of the first member and the second member.

According to the present invention, the first rolling grooves and the second rolling grooves, which rollably support the rolling bodies, are provided on the projections on the opposite end sides of the first member and on the second member, and the first rolling grooves and the second rolling grooves apply a pressure on the rolling bodies, caused by a magnetic attractive force of the magnet. Therefore, chattering/backlash between the first member and the second member can be prevented, together with suppressing differential slippage of the rolling bodies and achieving a reduction in scale of the linear actuator. Compared to a gothic arch structure or a circular structure, a high level of precision in machining accuracy and assembly accuracy of the rolling bodies, and the first and second rolling grooves is not required, and thus, the process steps for machining and assembling the linear actuator can be lessened.

The above and other objects features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 15A is a schematic view of a linear actuator in which magnetic paths are provided along directions of the arrow A according to a fourth modification, and in which a single plate-like permanent magnet is disposed on a side of a slide table confronting a guide rail, such that an S-pole of the permanent magnet faces toward the slide table and an N-pole of the permanent magnet faces toward the guide rail;

FIG. 15B is a schematic view of a linear actuator in which magnetic paths are provided along directions of the arrow A according to the fourth modification, and in which yokes are provided on opposite sides of the permanent magnet along directions of the arrow A in the linear actuator of FIG. 15A;

FIG. 15C is a schematic view of a linear actuator in which magnetic paths are provided along directions of the arrow A according to the fourth modification, and in which two permanent magnets, which are magnetized vertically, are disposed along directions of the arrow A on a side of the slide table confronting the guide rail, such that the polar orientations thereof are mutually opposite to each other;

FIG. 15D is a schematic view of a linear actuator in which magnetic paths are provided along directions of the arrow A according to the fourth modification, and in which four permanent magnets, which are magnetized vertically, are disposed along directions of the arrow A on a side of the slide table confronting the guide rail, such that the polar orientations thereof are mutually opposite to each other;

FIG. 15E is a schematic view of a linear actuator in which magnetic paths are provided along directions of the arrow A according to the fourth modification, and in which, in place of the four permanent magnets shown in FIG. 15D, a single plate-like permanent magnet is used, which is magnetized in multiple poles, and wherein respective magnetic polar orientations thereof are mutually opposite to each other along directions of the arrow A;

FIG. 15F is a schematic view of a linear actuator in which magnetic paths are provided along directions of the arrow A according to a fourth modification, and in which three permanent magnets, which are magnetized in directions of the arrow A, are disposed on a side of the slide table confronting the guide rail along directions of the arrow A, such that the polar orientations thereof are mutually opposite to each other, and yokes are provided on opposite sides of each of the permanent magnets;

FIG. 15G is a schematic view of a linear actuator in which magnetic paths are provided along directions of the arrow A according to the fourth modification, and in which permanent magnets are arranged in the form of a Halbach array along directions of the arrow A on a side of the slide table confronting the guide rail;

FIG. 16A is a schematic view of a linear actuator in which magnetic paths are provided along a lateral direction of the linear actuator (directions of the arrow B) according to the fourth modification, and in which a single plate-like permanent magnet is disposed on a side of a slide table confronting a guide rail, such that an S-pole of the permanent magnet faces toward the slide table and an N-pole of the permanent magnet faces toward the guide rail;

FIG. 16B is a schematic view of a linear actuator in which magnetic paths are provided along a lateral direction of the linear actuator (directions of the arrow B) according to the fourth modification, and in which yokes are provided on opposite sides of the permanent magnet along directions of the arrow B in the linear actuator of FIG. 16A;

FIG. 16C is a schematic view of a linear actuator in which magnetic paths are provided along a lateral direction of the linear actuator (directions of the arrow B) according to the fourth modification, and in which two permanent magnets, which are magnetized vertically, are disposed along directions of the arrow B on a side of the slide table confronting the guide rail, such that the polar orientations thereof are mutually opposite to each other;

FIG. 16D is a schematic view of a linear actuator in which magnetic paths are provided along a lateral direction of the linear actuator (directions of the arrow B) according to the fourth modification, and in which four permanent magnets, which are magnetized vertically, are disposed along directions of the arrow B on a side of the slide table confronting the guide rail, such that the polar orientations thereof are mutually opposite to each other;

FIG. 16E is a schematic view of a linear actuator in which magnetic paths are provided along a lateral direction of the linear actuator (directions of the arrow B) according to the fourth modification, and in which, in place of the four permanent magnets shown in FIG. 16D, a single plate-like permanent magnet is used, which is magnetized in multiple poles, and wherein respective magnetic polar orientations thereof are mutually opposite to each other along directions of the arrow B;

FIG. 16F is a schematic view of a linear actuator in which magnetic paths are provided along a lateral direction of the linear actuator (directions of the arrow B) according to the fourth modification, and in which three permanent magnets, which are magnetized in directions of the arrow B, are disposed on a side of the slide table confronting the guide rail along directions of the arrow B, such that the polar orientations thereof are mutually opposite to each other, and yokes are provided on opposite sides of each of the permanent magnets;

FIG. 16G is a schematic view of a linear actuator in which magnetic paths are provided along a lateral direction of the linear actuator (directions of the arrow B) according to the fourth modification, and in which permanent magnets are arranged in the form of a Halbach array along directions of the arrow B on a side of the slide table confronting the guide rail;

FIG. 17A is a schematic view of a linear actuator in which magnetic paths are provided along directions of the arrow A according to the fourth modification, and in which a single plate-like permanent magnet is disposed on a side of a guide rail confronting a slide table, such that an S-pole of the permanent magnet faces toward the slide table and an N-pole of the permanent magnet faces toward the guide rail;

FIG. 17B is a schematic view of a linear actuator in which magnetic paths are provided along directions of the arrow A according to the fourth modification, and in which yokes are provided on opposite sides of the permanent magnet along directions of the arrow A in the linear actuator of FIG. 17A;

FIG. 17C is a schematic view of a linear actuator in which magnetic paths are provided along directions of the arrow A according to the fourth modification, and in which two permanent magnets, which are magnetized vertically, are disposed along directions of the arrow A on a side of the guide rail confronting the slide table, such that the polar orientations thereof are mutually opposite to each other;

FIG. 17D is a schematic view of a linear actuator in which magnetic paths are provided along directions of the arrow A according to the fourth modification, and in which four permanent magnets, which are magnetized vertically, are disposed along directions of the arrow A on a side of the guide rail confronting the slide table, such that the polar orientations thereof are mutually opposite to each other;

FIG. 17E is a schematic view of a linear actuator in which magnetic paths are provided along directions of the arrow A according to the fourth modification, and in which, in place of the four permanent magnets shown in FIG. 17D, a single plate-like permanent magnet is used, which is magnetized in multiple poles, and wherein respective magnetic polar orientations thereof are mutually opposite to each other along directions of the arrow A;

FIG. 17F is a schematic view of a linear actuator in which magnetic paths are provided along directions of the arrow A according to the fourth modification, and in which three permanent magnets, which are magnetized in directions of the arrow A, are disposed on a side of the guide rail confronting the slide table along directions of the arrow A, such that the polar orientations thereof are mutually opposite to each other, and yokes are provided on opposite sides of each of the permanent magnets;

FIG. 17G is a schematic view of a linear actuator in which magnetic paths are provided along directions of the arrow A according to the fourth modification, and in which permanent magnets are arranged in the form of a Halbach array along directions of the arrow A on a side of the guide rail confronting the slide table;

FIG. 18A is a schematic view of a linear actuator in which magnetic paths are provided along a lateral direction of the linear actuator (directions of the arrow B) according to the fourth modification, and in which a single plate-like permanent magnet is disposed on a side of a guide rail confronting a slide table, such that an S-pole of the permanent magnet faces toward the slide table and an N-pole of the permanent magnet faces toward the guide rail;

FIG. 18B is a schematic view of a linear actuator in which magnetic paths are provided along a lateral direction of the linear actuator (directions of the arrow B) according to the fourth modification, and in which yokes are provided on opposite sides of the permanent magnet along directions of the arrow B in the linear actuator of FIG. 18A;

FIG. 18C is a schematic view of a linear actuator in which magnetic paths are provided along a lateral direction of the linear actuator (directions of the arrow B) according to the fourth modification, and in which two permanent magnets, which are magnetized vertically, are disposed along directions of the arrow B on a side of the guide rail confronting the slide table, such that the polar orientations thereof are mutually opposite to each other;

FIG. 18D is a schematic view of a linear actuator in which magnetic paths are provided along a lateral direction of the linear actuator (directions of the arrow B) according to the fourth modification, and in which four permanent magnets, which are magnetized vertically, are disposed along directions of the arrow B on a side of the guide rail confronting the slide table, such that the polar orientations thereof are mutually opposite to each other;

FIG. 18E is a schematic view of a linear actuator in which magnetic paths are provided along a lateral direction of the linear actuator (directions of the arrow B) according to the fourth modification, and in which, in place of the four permanent magnets shown in FIG. 18D, a single plate-like permanent magnet is used, which is magnetized in multiple poles, and wherein respective magnetic poles thereof are mutually opposite to each other along directions of the arrow B;

FIG. 18F is a schematic view of a linear actuator in which magnetic paths are provided along a lateral direction of the linear actuator (directions of the arrow B) according to the fourth modification, and in which three permanent magnets, which are magnetized in directions of the arrow B, are disposed on a side of the guide rail confronting the slide table along directions of the arrow B, such that the polar orientations thereof are mutually opposite to each other, and yokes are provided on opposite sides of each of the permanent magnets; and FIG. 18G is a schematic view of a linear actuator in which magnetic paths are provided along a lateral direction of the linear actuator (directions of the arrow B) according to the fourth modification, and in which permanent magnets are arranged in the form of a Halbach array along directions of the arrow B on a side of the guide rail confronting the slide table.

DESCRIPTION OF THE PREFERRED EMBODIMENTS

Preferred embodiments of linear actuators according to the present invention shall be described in detail below with reference to the accompanying drawings.

First Embodiment

Figure 1:
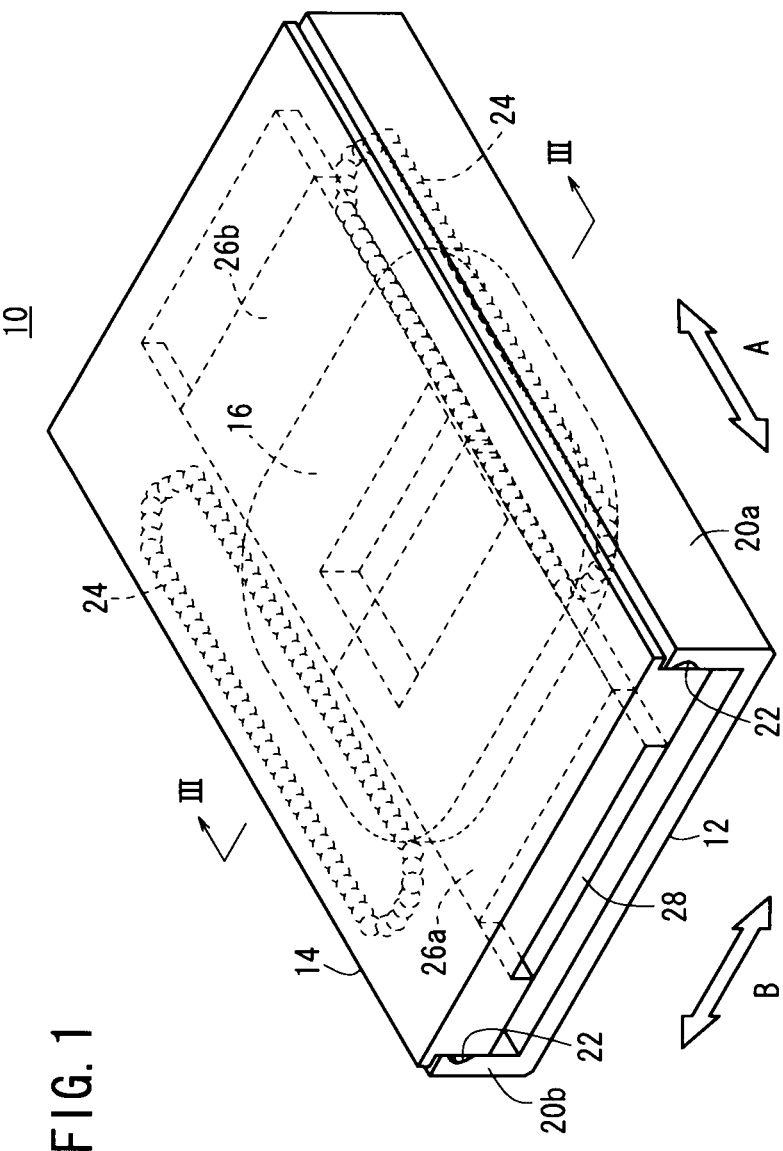
FIG. 1 is a perspective view of a linear actuator according to a first embodiment.
Figure 2:
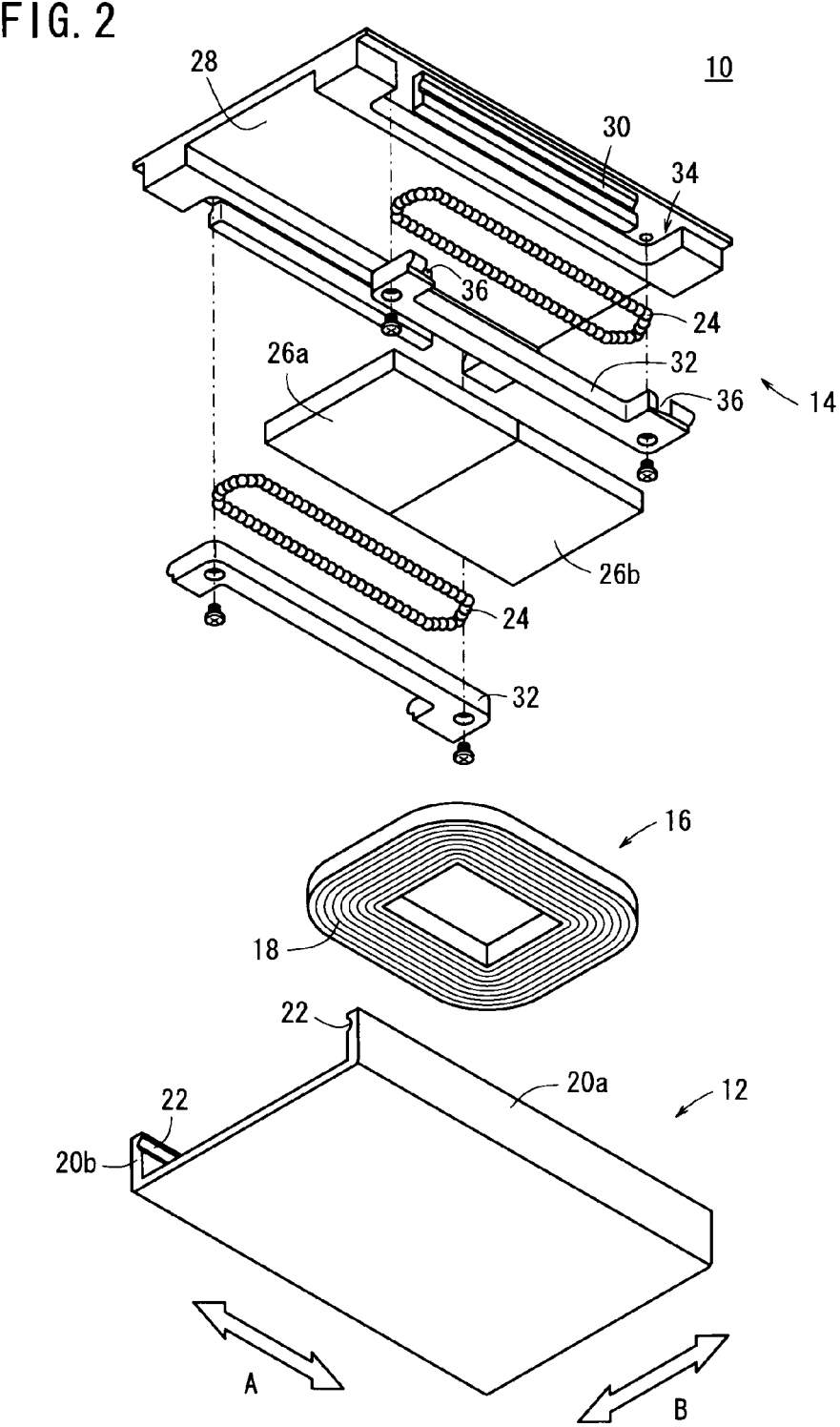
FIG. 2 is an exploded perspective view of the linear actuator shown in FIG. 1.

FIG. 1 is a perspective view showing a linear actuator 10 according to a first embodiment of the present invention, FIG.

Figure 3:
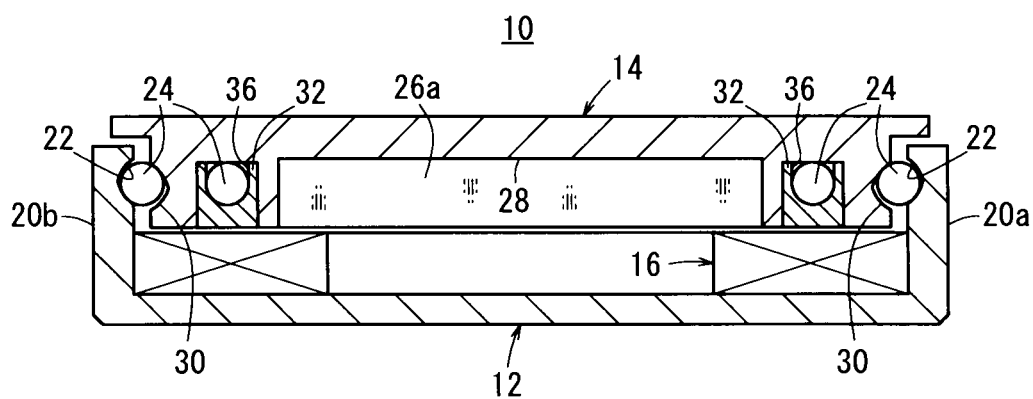
FIG. 3 is a cross sectional view as seen in the direction of the arrows and taken along line III-III of FIG. 1.

2 is an exploded perspective view of the linear actuator 10, and FIG. 3 is a cross sectional view as seen in the direction of the arrows and taken along line of FIG. 1.

The linear actuator 10 according to the first embodiment is equipped with a guide rail (first member) 12 and a slide table (second member) 14, which is arranged in confronting relation to the guide rail 12. The guide rail 12 is U-shaped in cross section, and a coil 16, which faces toward the slide table 14, is disposed on the guide rail 12. The coil 16 is a doughnut-shaped or air core coil, in which an insulative film covered conductive wire is wound, and the coil is further formed by molding with an insulated body 18 made of resin. The coil 16 is disposed substantially centrally on an upper surface of the guide rail 12.

On opposite sides in the lateral direction (directions of the arrow B) of the guide rail 12, projections 20a, 20b are formed to project from the base of the guide rail 12 toward the slide table 14, and on inner sides of the projections 20a, 20b, guide grooves (first rolling grooves) 22, 22 are formed, which extend along directions of the arrow A (or along directions in which the slide table 14 slides).

The slide table 14 is disposed between the projections 20a, 20b of the guide rail 12, with a plurality of rigid balls (rolling bodies, hereinafter also referred to simply as "balls") 24 being interposed therebetween and which are capable of displacing the relative position between the guide rail 12 and the slide table 14. Two permanent magnets (magnets) 26a, 26b are disposed on a surface of the slide table 14 in confronting relation to the guide rail 12. More specifically, a recess 28 is formed in a substantially central portion in the lateral direction (a direction perpendicular to the directions of the arrow A) of the slide table 14, and the permanent magnets 26a, 26b are disposed in the recess 28. The coil 16 provided on the guide rail 12 and the permanent magnets 26a, 26b provided on the slide table 14 are arranged at a predetermined interval or gap. Guide grooves (second rolling grooves) 30, 30 are formed along the directions of the arrow A in central portions on both ends in the lateral direction of the slide table 14. The balls 24 are rollably supported by the guide grooves 22, 22 and the guide grooves 30, 30.

Recesses 34 in which return guides 32 are fitted are provided on the slide table 14. Grooves (also referred to below as "circulation passages") 36 are formed in the return guides 32 for allowing the balls 24 to circulate therethrough, such that the balls 24, which have rolled up to the ends of the guide grooves 30, 30 are made to roll into the circulation passages 36 by the return guides 32. In other words, the return guides 32 function to switch the rolling direction of the balls 24 by 180°.

In the linear actuator 10, the guide rail 12 and the slide table 14 are arranged such that the guide grooves 22, 22 and the guide grooves 30, 30 are located substantially at the same height, with the plurality of balls 24 being accommodated as a linear guide in the circulation passages 36 and in spaces (gaps) formed by the guide grooves 22, 22 and the guide grooves 30, 30. Under a guiding action performed by rolling of the respective balls 24, the slide table 14 is displaceable in the directions of the arrow A with respect to the guide rail 12. A plurality of non-illustrated screw holes are formed in the slide table 14 along the plate-thickness direction thereof, whereby another member, such as a workpiece or the like, can be fixed to the slide table 14 by bolts (not shown) which are screw-inserted into the screw holes.

The size of each of the permanent magnets 26a, 26b is set to be smaller than the size of the coil 16. Although in the present embodiment, two permanent magnets 26a, 26b are disposed thereon, one or three or more permanent magnets may be disposed on the slide table 14.

The guide rail 12 and the slide table 14 are made of magnetic materials. The balls 24 and the return guides 32 may be made from either magnetic or non-magnetic materials. Further, magnetic balls (first rolling bodies) 24 and non-magnetic (e.g., resin material) balls (second rolling bodies) 24 may be arranged alternately along the directions of the arrow A.

In the linear actuator 10, in the case that the slide table 14 is displaced in the directions of the arrow A under guidance of the plural balls 24, although the balls 24 generally rotate in a uniform direction, at the surfaces of respective adjacent balls 24, which are in mutual contact with each other, the respective balls 24 tend to rotate in mutually opposite directions. As a result thereof, high frictional drag is generated between the respective balls 24, and positional slippage of the balls 24 occurs, leading to the possibility that the slide table 14 cannot be smoothly displaced. Accordingly, by arranging magnetic balls 24 and non-magnetic balls 24 alternately, frictional drag between adjacent balls 24 is suppressed, and the slide table 14 can be displaced smoothly. Further, by making at least some of the balls 24 from a magnetic material, generation of leakage magnetic flux in spaces between the projections 20a, 20b and the slide table 14 can be suppressed.

As a result of the fact that the guide rail 12 is constituted by a magnetic body, a magnetic attractive force works between the permanent magnets 26a, 26b and the guide rail 12, whereby a downwardly directed force is imposed on the slide table 14. According to the first embodiment, the side of the guide rail 12 is defined as a downward side, whereas the side of the slide table 14 is defined as an upward side.

Figure 4:
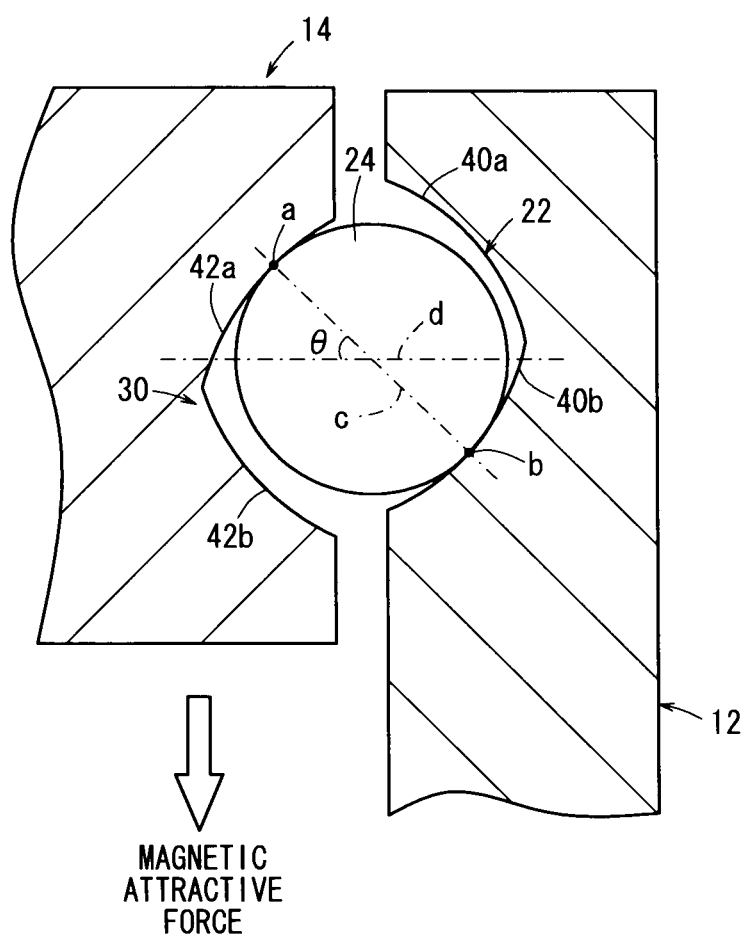
FIG. 4 is a view showing a guide groove of a guide rail and a guide groove of a slide table supporting balls therebetween.

FIG. 4 is a view showing the guide groove 22 and the guide groove 30, which support the balls 24 therebetween. The guide groove 22 and the guide groove 30 make up grooves which are formed from a combination of two arcs, having radii of curvature that are greater than that of the radius of each of the balls 24. In greater detail, the guide groove 22 is constituted by a first curved surface 40a formed with an arc having a first radius of curvature, and a second curved surface 40b formed with an arc having a second radius of curvature, and the guide groove 30 is constituted by a first curved surface 42a formed with an arc having a third radius of curvature, and a second curved surface 42b formed with an arc having a fourth radius of curvature.

The balls 24 are supported by abutment of the first curved surface 42a of the guide groove 30 and the second curved surface 40b of the guide groove 22 against the balls 24. Stated otherwise, the balls 24 are supported by the first curved surface 42a of the guide groove 30 and the second curved surface 40b of the guide groove 22. A line c, which links the contact point a between the first curved surface 42a of the guide groove 30 and the ball 24, and the contact point b between the second curved surface 40b of the guide groove 22 and the ball 24, passes through the center of the ball 24. An angle θ, which is formed between the line c passing through the contact point a and the contact point b, and a plane d that passes through the center of the ball 24 and extends in the lateral direction of the guide rail 12 and the slide table 14, is less than 90°. Further, the first curved surface 42a of the guide groove 30 and the second curved surface 40b of the guide groove 22 are formed so that the angle θ, which is formed between the line c and the plane d, is an angle of a predetermined value.

The balls 24 normally cannot be firmly supported at the first curved surface 42a of the guide groove 30 and the second curved surface 40b of the guide groove 22, however, as noted above, due to the magnetic attractive force of the permanent magnets 26a, 26b, a force is applied on the slide table 14 in a downward direction, and therefore, a pressing force can be applied on the balls 24 in an inclined direction by the first curved surface 42a of the guide groove 30 and the first curved surface 40a of the guide groove 22. In other words, the pressing force is applied on the balls 24 by the two points of the contact point a and the contact point b. Accordingly, even with the simple structure shown in FIG. 4, the balls 24 can be firmly retained, and chattering/backlash between the guide rail 12 and the slide table 14 can be prevented.

The ratio of precision with which chattering/backslash is prevented in the lateral direction of the guide rail 12 and the slide table 14, and with which chattering/backslash is prevented in the vertical direction of the guide rail 12 and the slide table 14 can be changed corresponding to the angle θ formed between the line c and the plane d. If the formed angle θ is 45°, then the forces applied on the balls 24 in the lateral direction and in the vertical direction are the same, and therefore, the precisions with which backlash/chattering is prevented in the lateral direction and in the vertical direction are the same. As the formed angle θ becomes smaller than 45°, the precision with which backlash/chattering is prevented in the lateral direction improves, however, the precision with which backlash/chattering is prevented in the vertical direction worsens. Further, as the formed angle θ becomes greater than 45°, the precision with which backlash/chattering is prevented in the vertical direction improves, however, the precision with which backlash/chattering is prevented in the lateral direction worsens.

With the gothic arch structure of the prior art, the size of the balls 24, the shape and size of the guide grooves 22 and the guide grooves 30, etc., have required adjustment and selection thereof on the order of a few μm, however, with the present embodiment, even if such highly-precise adjustments are not made, with a simple structure, the accuracy with which backlash and chattering between the guide rail 12 and the slide table 14 is prevented can be improved. Further, because the balls 24 are supported at the two points consisting of the contact point a and the contact point b, differential slippage of the balls 24 can be suppressed. Additionally, since four rows of guide grooves as in the aforementioned circular-type structure are not required, the structure of the linear actuator can be simplified and reduced in scale.

Figure 5:
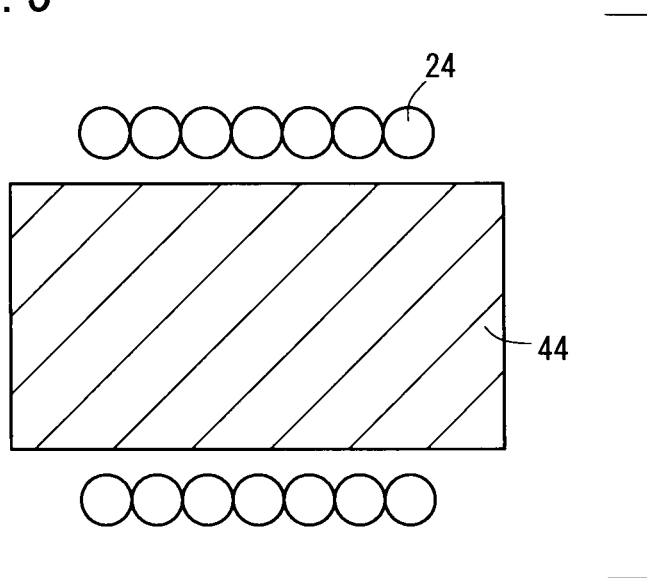
FIG. 5 is a schematic view showing the relationship between a range within which the balls are supported in a longitudinal direction of the linear actuator and a range (region shown by hatching) within which a magnetic attractive force is generated by permanent magnets.

FIG. 5 is a schematic drawing showing the relationship between a range within which the balls 24 are supported in a longitudinal direction of the linear actuator 10 and a range 44 (region shown by hatching) within which a magnetic attractive force is generated by the permanent magnets 26a, 26b. In the first embodiment, the range within which the balls 24 are supported by means of the guide rail 12 and the slide table 14 in a longitudinal direction of the linear actuator 10 is shorter than the range 44 within which the magnetic attractive force is generated by the permanent magnets 26a, 26b.

Next, operations of the linear actuator according to the first embodiment shall briefly be described. The linear actuator 10 serves to displace the relative position of the slide table 14 with respect to the guide rail 12. More specifically, an electric current energizes the coil 16, and by a magnetic flux generated by the permanent magnets 26a, 26b and the current that flows through the coil 16, based on Fleming's left hand rule, a thrust force (Lorentz force) is generated by the coil 16 in one of the directions of the arrow A. Owing thereto, the position of the slide table 14 with respect to the guide rail 12 is displaced in the direction of the arrow A. Further, the displacement direction of the slide table 14 can be changed by altering the direction of the current that energizes the coil 16. Accordingly, by changing the direction of the current that energizes the coil 16, the slide table 14 makes reciprocal movements on the guide rail 12.

In this manner, according to the first embodiment, in the linear actuator 10, by utilizing the magnetic attractive force of the permanent magnets 26a, 26b, and through the upper side first curved surfaces 42a of the guide grooves 30, 30 of the slide table 14 and the lower side second curved surfaces 40b of the guide grooves 22, 22 of the guide rail 12, a diagonally oriented or inclined pressure can be applied to the balls 24, and therefore, with a simple structure, chattering/backlash between the guide rail 12 and the slide table 14 can be prevented together with suppressing differential slippage of the balls 24 and achieving a reduction in scale of the linear actuator 10. Compared to a gothic arch structure or a circular structure, a high level of precision in machining accuracy and assembly accuracy of the balls 24, the guide grooves 22, 22 and the guide grooves 30, 30 is not required, and therefore, the process steps for machining and assembling the linear actuator 10 can be lessened.

Moreover, with the first embodiment, for applying a pressure in a downward direction to the slide table 14, a magnetic attractive force of the permanent magnets 26a, 26b is used positively. However, another permanent magnet separate from the permanent magnets 26a, 26b may be provided, and the magnetic attractive force of such a permanent magnet may be used positively as well. In this case, it is necessary to arrange the separately provided permanent magnet at a position so as not to disturb the movement of the slide table 14 as a result of the magnetic flux produced by the separately provided permanent magnet.

Further, according to the first embodiment, the coil 16 is disposed on the guide rail 12 and the permanent magnets 26a, 26b are disposed on the slide table 14, however, the permanent magnets 26a, 26b may be disposed on the guide rail 12 and the coil 16 may be disposed on the slide table 14. In this case as well, pressure can be applied with respect to the balls 24 in an inclined direction by the magnetic attractive force of the permanent magnets 26a, 26b.

Second Embodiment

Figure 6:
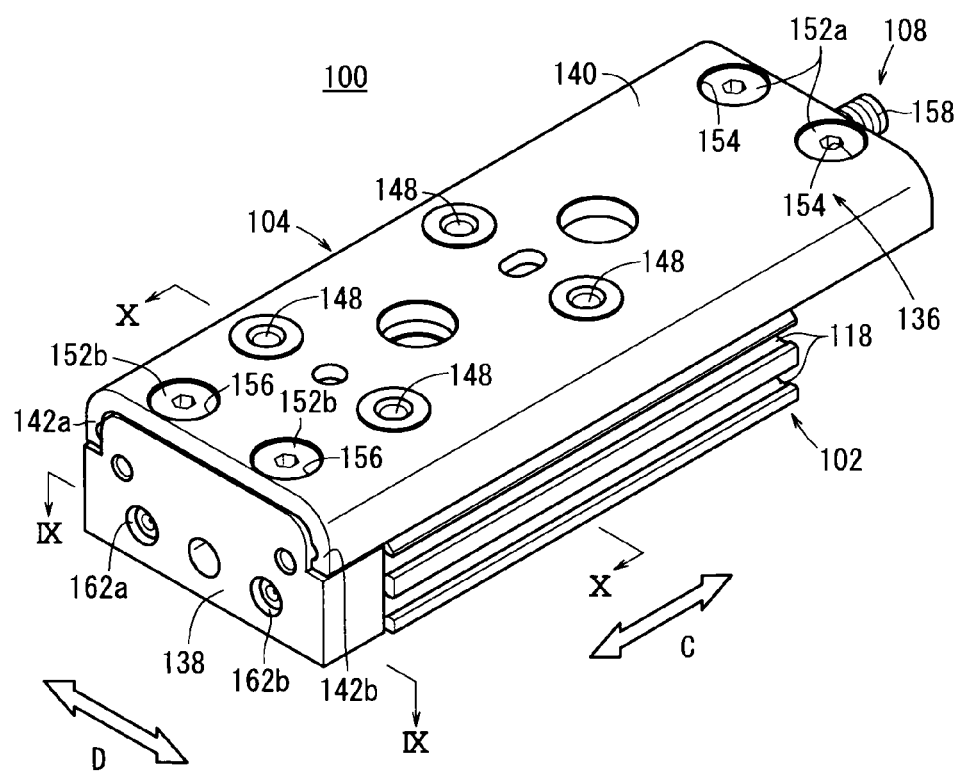
FIG. 6 is a perspective view of a linear actuator according to a second embodiment.
Figure 7:
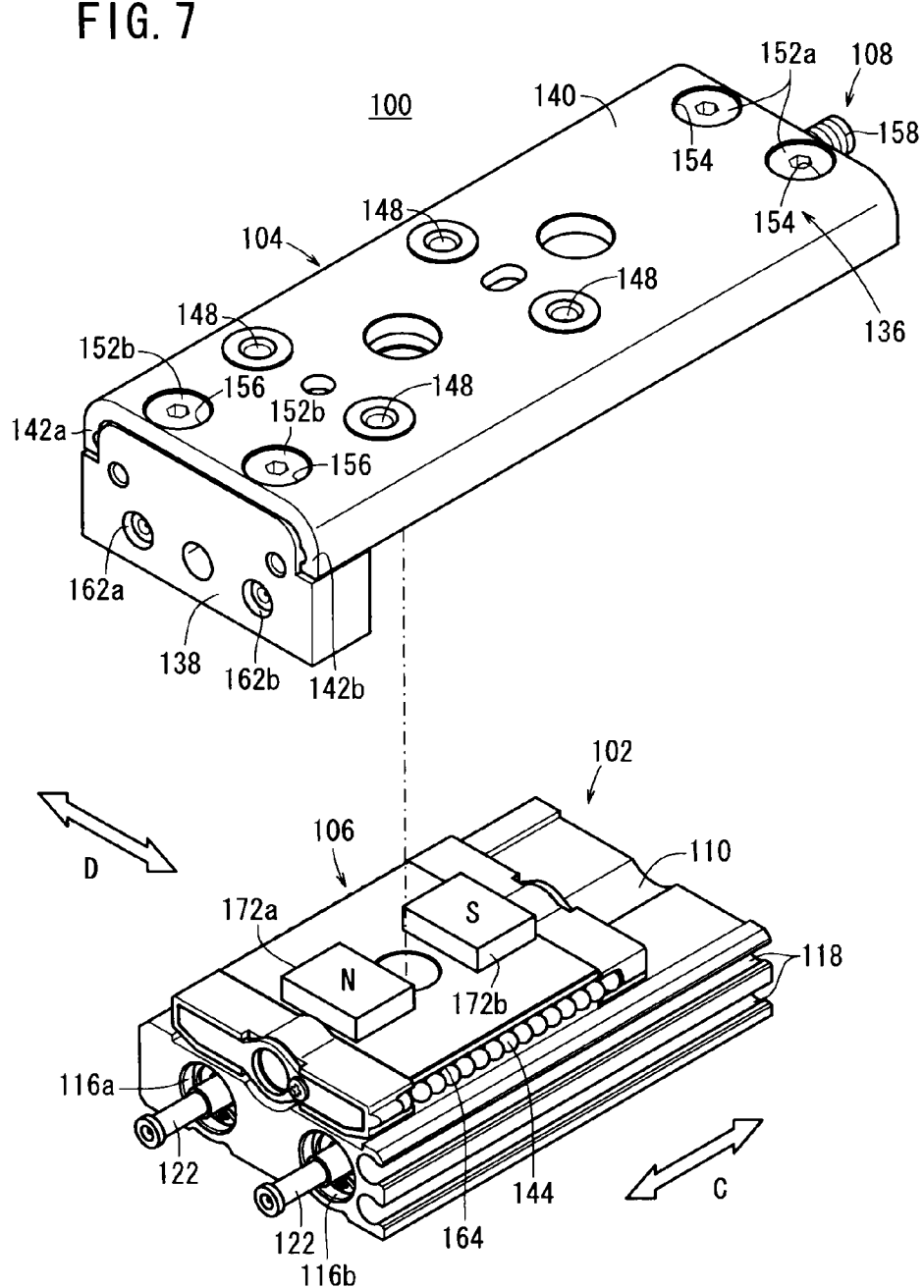
FIG. 7 is an exploded perspective view as seen from above of the linear actuator shown in FIG. 6.
Figure 8:
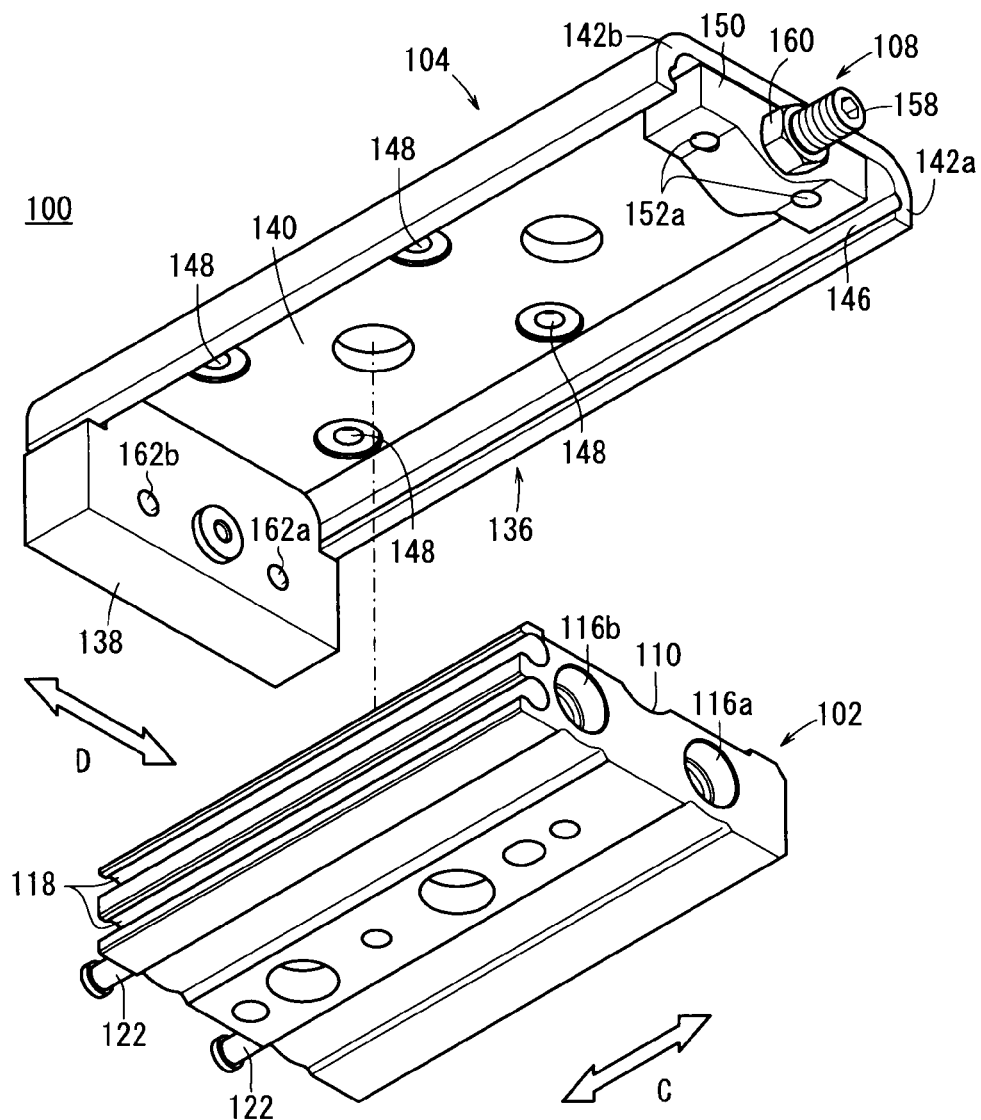
FIG. 8 is an exploded perspective view as seen from below of the linear actuator shown in FIG. 6.
Figure 9:
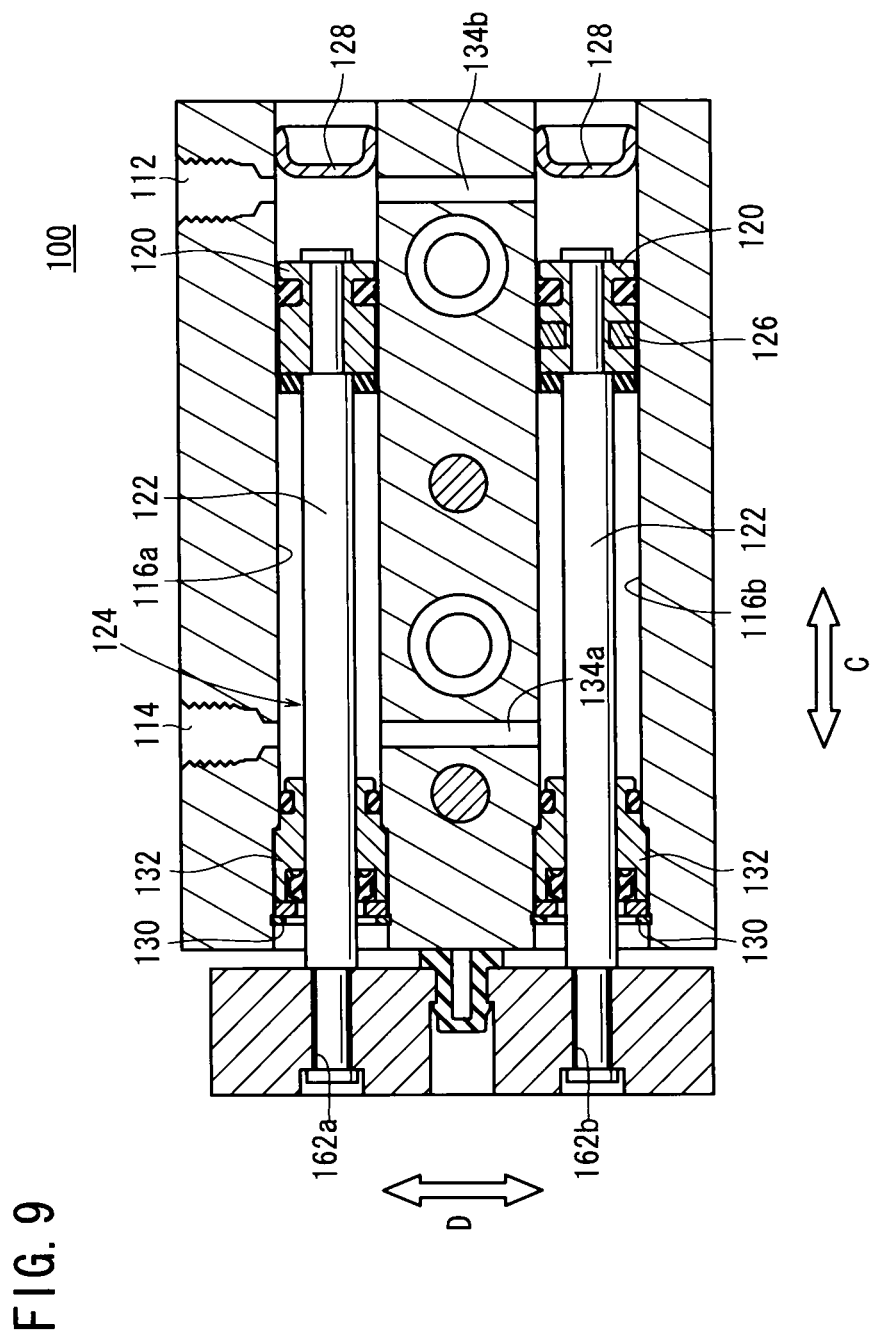
FIG. 9 is a cross sectional view as seen in the direction of the arrows and taken along line IX-IX of FIG. 6.
Figure 10:
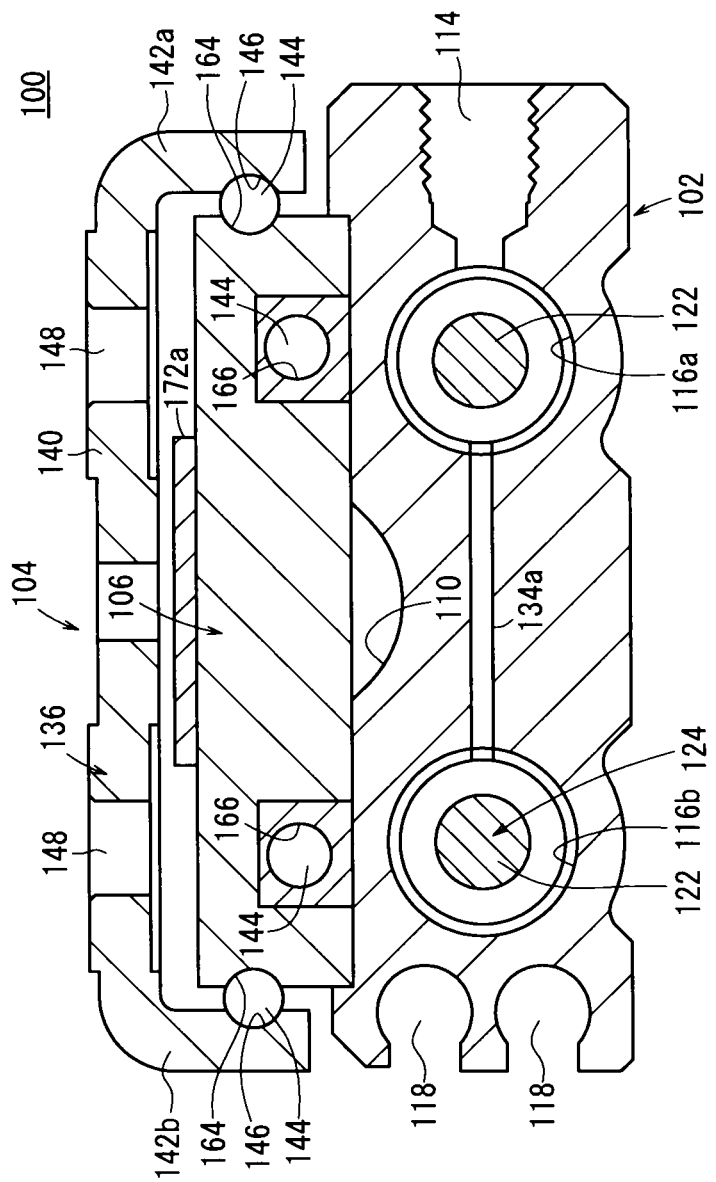
FIG. 10 is a cross sectional view as seen in the direction of the arrows and taken along line X-X of FIG. 6.

FIG. 6 is a perspective view of a linear actuator 100 according to a second embodiment, FIG. 7 is an exploded perspective view as seen from above the linear actuator 100, FIG. 8 is an exploded perspective view as seen from below the linear actuator 100, FIG. 9 is a cross sectional view as seen in the direction of the arrows and taken along line IX-IX of FIG. 6, and FIG. 10 is a cross sectional view as seen in the direction of the arrows and taken along line X-X of FIG. 6.

The linear actuator 100 according to the second embodiment includes a cylinder main body 102, a slide table (first member) 104 disposed on an upper portion of the cylinder main body 102 and which moves reciprocally and linearly along the longitudinal direction (in directions of the arrow C), a guide mechanism (second member) 106 interposed between the cylinder main body 102 and the slide table 104, which guides the slide table 104 along the longitudinal direction (in directions of the arrow C), and a stopper mechanism 108, which is capable of adjusting the displacement amount of the slide table 104.

The cylinder main body 102 is formed with a rectangular shape in cross section and a predetermined length along the longitudinal direction. A recess 110 is formed substantially centrally on the upper surface of the cylinder main body 102. The recess 110 has a substantially arcuate shape in cross section, and extends in the longitudinal direction. The guide mechanism 106 is connected to the cylinder main body 102 through non-illustrated connecting bolts.

Further, in one side surface of the cylinder main body 102, first and second ports 112, 114 (fluid inlet/outlet ports) for supplying and discharging a pressure fluid are formed perpendicularly to the longitudinal direction of the cylinder main body 102, which communicate with a pair of through holes (cylinder chambers) 116a, 116b (see FIG. 9). Furthermore, on the other side surface of the cylinder main body 102, two rows of sensor attachment grooves 118 are formed in the longitudinal direction, into which a non-illustrated detection sensor is installed.

The two through holes 116a, 116b are formed along the longitudinal direction (in the directions of the arrow A) of the cylinder main body 102. One of the through holes 116a and the other of the through holes 116b are arrayed substantially in parallel and separated by a predetermined interval. A cylinder mechanism 124 including pistons 120 and piston rods 122 connected to the pistons 120 is disposed in the respective through holes 116a, 116b.

The cylinder mechanism 124 is constituted by installation of the pair of pistons 120 and the piston rods 122 respectively in the pair of through holes 116a, 116b. Further, a magnet 126 is installed on an outer circumferential surface of one of the pistons 120. The magnet 126 is disposed only on one of the pistons 120, which resides on the side of the sensor attachment grooves 118 in the cylinder main body 102. Magnetism from the magnet 126 is detected by the detection sensor (not shown) installed in the sensor attachment grooves 118, whereby the displacement position of the pistons 120 in the axial direction is detected.

One ends of the through holes 116a, 116b are blocked and sealed by caps 128, whereas the other ends of the through holes 116a, 116b are sealed hermetically by rod holders 132, which are retained via snap rings 130.

Mutual communication between the through holes 116a and 116b is established through a pair of connecting passages 134a, 134b formed between the through hole 116b and the through hole 116a. More specifically, pressure fluid supplied to the first port 112 and the second port 114, after having been introduced into one of the through holes 116a, is further introduced into the other through hole 116b through the connecting passages 134a, 134b. The connecting passages 134a, 134b are formed perpendicularly to the direction of extension (the directions of the arrow C) of the through holes 116a, 116b.

The slide table 104 is equipped with a slide table main body 136, a stopper mechanism 108 connected to one end of the slide table main body 136, and an end plate (retaining member) 138 connected to the other end of the slide table main body 136. The end plate 138 is connected perpendicularly with respect to the slide table main body 136.

The slide table main body 136 is made up from a base member 140 that extends along the longitudinal direction (in the directions of the arrow C) with a predetermined thickness, and a pair of projections 142a, 142b that project downward (toward the cylinder main body 102) perpendicularly from both sides of the base member 140. On inner surfaces of the projections 142a, 142b, guide grooves (first rolling grooves) 146, 146 for guiding rigid balls (rolling bodies, hereinafter referred to simply as "balls") 144 are formed along directions of the arrow C (in the sliding direction of the slide table 104).

Four workpiece retaining holes 148 are formed on the base member 140 between one end and the other end thereof. The workpiece retaining holes 148 are separated mutually by predetermined distances. For example, when a workpiece (not shown) is loaded on an upper surface of the slide table 104 and transported, the workpiece is fixed to the slide table 104 through the workpiece retaining holes 148.

Further, a pair of bolt holes 154, through which bolts 152a are inserted for fixing a holder 150 of the stopper mechanism 108, is formed on one end of the slide table main body 136, and on the other end thereof, a pair of bolt holes 156 is formed, through which bolts 152b are inserted for fixing the end plate 138. The bolt holes 154, 156 all penetrate through the slide table main body 136 in directions perpendicular to the directions of extension (the directions of arrows C and D) of the slide table main body 136. The stopper mechanism 108 includes a stopper bolt 158, which is screw-engaged with respect to the holder 150, and a lock nut 160 that regulates advancing and retracting movements of the stopper bolt 158. The stopper mechanism 108 is disposed so as to face toward the guide mechanism 106, which is disposed on the cylinder main body 102.

The end plate 138 is fixed by two bolts 152b, which are inserted through bolt holes 156 formed in the other end of the slide table main body 136. The end plate 138 is disposed so as to face toward an end surface of the cylinder main body 102, and is fixed respectively to ends of the piston rods 122, which are inserted through a pair of rod holes 162a, 162b. Owing thereto, the slide table 104 including the end plate 138 is made displaceable together with the piston rods 122 along the longitudinal direction of the cylinder main body 102.

Guide grooves (second rolling grooves) 164, 164 are formed at both ends of the guide mechanism 106 in the lateral direction (in directions of the arrow B) and along the directions of the arrow C. The balls 144 are supported so as to be capable of rolling by the guide grooves 146, 146 and the guide grooves 164, 164. Furthermore, circulation passages 166 for circulating the balls 144 are formed in the guide mechanism 106, such that the balls 144, which have rolled up to ends of the guide grooves 164, are turned around and are made to roll in a 180° reverse direction by the circulation passages 166.

With the linear actuator 100, the guide mechanism 106 connected to the cylinder main body 102 and the slide table 104 are arranged such that the guide grooves 146 and the guide grooves 164 are located substantially at the same height. The plural balls 144 are accommodated as a linear guide in the space (gap) formed by the guide grooves 146 and the guide grooves 164, and in the circulation passages. Under a guiding action by rolling of the respective balls 144, the slide table 104 is made displaceable in the directions of the arrow C with respect to the guide mechanism 106, which is connected to the cylinder main body 102. Further, as shown in FIG. 7, permanent magnets (magnets) 172a, 172b are disposed on the upper surface of the guide mechanism 106. A magnetic attractive force works between the permanent magnets 172a, 172b and the slide table 104, whereby a downwardly directed force is imposed on the slide table 104. According to the second embodiment, the side of the cylinder main body 102 is defined as a downward side, whereas the side of the slide table 104 is defined as an upward side. Further, the slide table 104 and the guide mechanism 106 are made of magnetic materials. The guide mechanism 106 may simply include a magnetic material therein, and more specifically, may be made of materials comprising both magnetic and non-magnetic materials. For example, in the guide mechanism 106, the members forming the guide grooves 164, 164 may be formed from a resin, whereas other members apart therefrom may be formed from a magnetic material. Further, magnetic balls (first rolling bodies) 144 and non-magnetic balls (second rolling bodies) 144 may be arranged alternately along the directions of the arrow C.

Figure 11:
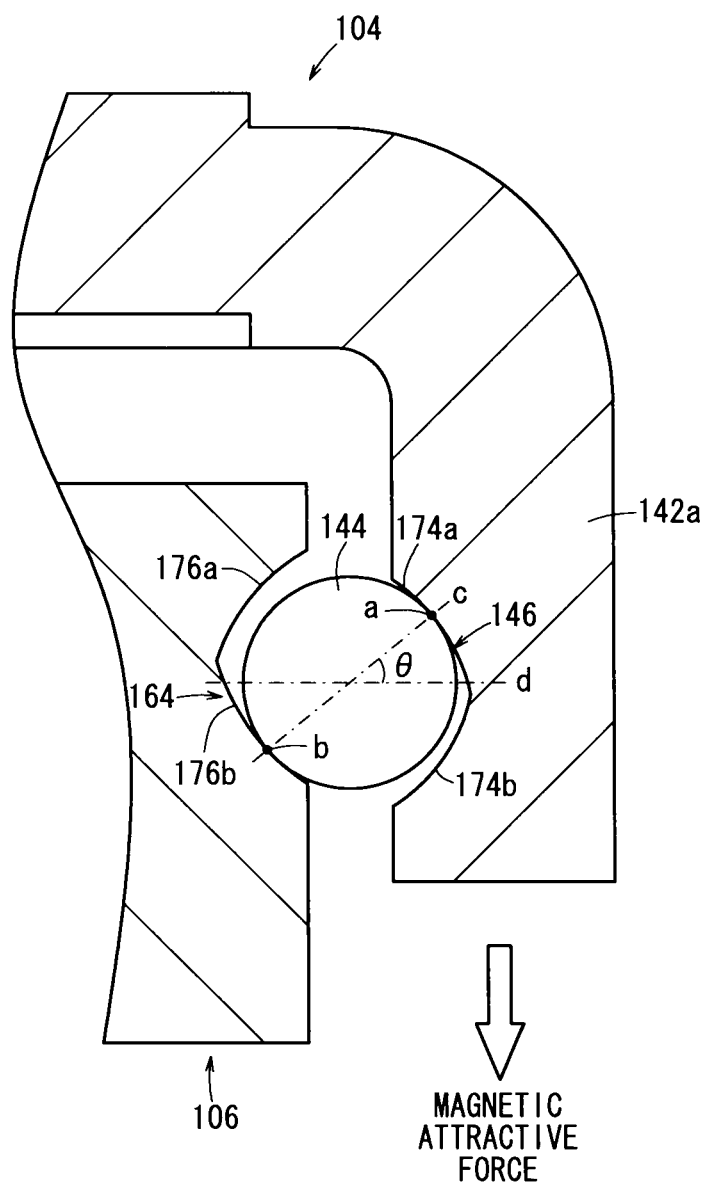
FIG. 11 is a view showing a guide groove of a guide rail and a guide groove of a slide table supporting balls therebetween.

FIG. 11 is a view showing the guide groove 146 and the guide groove 164, which support the balls 144 therebetween. The guide groove 146 and the guide groove 164 make up grooves which are formed from a combination of two arcs, having radii of curvature that are greater than that of the radius of each of the balls 144. In greater detail, the guide groove 146 is constituted by a first curved surface 174a formed with an arc having a first radius of curvature, and a second curved surface 174b formed with an arc having a second radius of curvature, and the guide groove 164 is constituted by a first curved surface 176a formed with an arc having a third radius of curvature, and a second curved surface 176b formed with an arc having a fourth radius of curvature.

The balls 144 are supported by abutment of the first curved surface 174a of the guide groove 146 and the second curved surface 176b of the guide groove 164 against the balls 144. A line c, which links the contact point a between the first curved surface 174a of the guide groove 146 and the ball 144, and the contact point b between the second curved surface 176b of the guide groove 164 and the ball 144, passes through the center of the ball 144. An angle θ, which is formed between the line c passing through the contact point a and the contact point b, and a plane d that passes through the center of the ball 144 and extends in the lateral direction of the slide table 104, is less than 90°. The first curved surface 174a of the guide groove 146 and the second curved surface 176b of the guide groove 164 are formed so that the angle θ, which is formed between the line c and the plane d, is an angle of a predetermined value.

The balls 144 normally cannot be firmly supported at the first curved surface 174a of the guide groove 146 and the second curved surface 176b of the guide groove 164, however, as noted above, due to the magnetic attractive force of the permanent magnets 172a, 172b, a force is applied on the slide table 104 in a downward direction, and therefore, a pressing force can be applied on the balls 144 in a diagonal or inclined direction by the first curved surface 174a of the guide groove 146 and the second curved surface 176b of the guide groove 164. In other words, the pressing force is applied on the balls 144 by the two points of the contact point a and the contact point b. Accordingly, even with the simple structure shown in FIG. 11, the balls 144 can be firmly retained, and chattering/backlash between the slide table 104 and the guide mechanism 106 can be prevented.

The ratio of precision with which chattering/backslash is prevented in the lateral direction of the slide table 104 and the guide mechanism 106, and with which chattering/backslash is prevented in the vertical direction of the slide table 104 and the guide mechanism 106 can be changed corresponding to the angle θ formed between the line c and the plane d.

Figure 12:
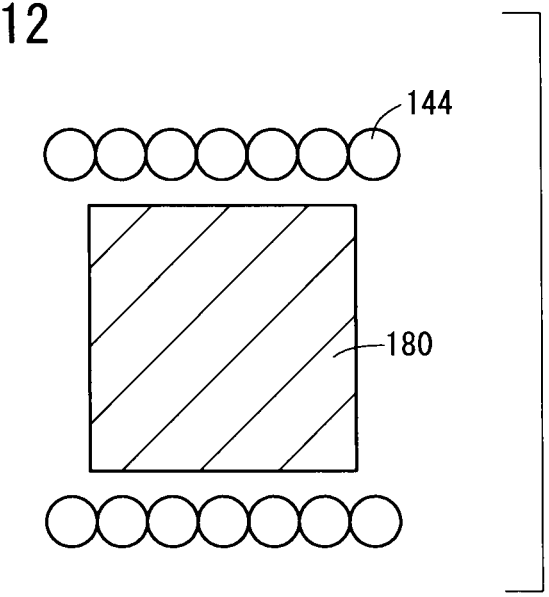
FIG. 12 is a schematic view showing the relationship between a range within which the balls are supported in a longitudinal direction of the linear actuator and a range (region shown by hatching) within which a magnetic attractive force is generated by permanent magnets.

FIG. 12 is a schematic drawing showing the relationship between a range within which the balls 144 are supported in a longitudinal direction of the linear actuator 100 and a range 180 (region shown by hatching) within which a magnetic attractive force is generated by the permanent magnets 172a, 172b. In the second embodiment, the range within which the balls 144 are supported by means of the slide table 104 and the guide mechanism 106 in a longitudinal direction of the linear actuator 100 is longer than the range within which the magnetic attractive force is generated by the permanent magnets 172a, 172b.

Next, operations of the linear actuator 100 according to the second embodiment shall briefly be described. In the following description, as shown in FIG. 6, a condition in which the end plate 138 of the slide table 104 abuts against an end surface of the cylinder main body 102 shall be treated as an initial position.

At first, a pressure fluid from a non-illustrated pressure fluid supply source is introduced into the first port 112. In this case, the second port 114 is placed in a state of being open to atmosphere by a non-illustrated switching valve. Pressure fluid supplied to the first port 112 is supplied to one of the through holes 116a, together with being supplied into the other through hole 116b by passing through the connecting passage 134b, whereupon the pistons 120 are pressed toward the side of the rod holders 132. Thus, the piston rods 122 connected to the pistons 120 move together with the slide table 104 in a direction such that the pistons 120 approach the rod holders 132 (i.e., in a direction so that the end plate 138 separates away from the cylinder main body 102).

In addition, by abutment of the end of the stopper bolt 158, which is disposed on one end portion of the slide table 104, against an end surface of the guide mechanism 106, displacement of the slide table 104 is stopped and the slide table 104 reaches a displacement terminal end position. The stopper mechanism 108 is capable of adjusting the displacement amount of the slide table 104 by loosening the lock nut 160 and, after the stopper bolt 158 has been made capable of advancing and retracting, adjusting the amount by which the stopper bolt 158 projects from the end surface of the holder 150, and thereafter retightening the lock nut 160.

On the other hand, in the case that the slide table 104 is displaced in a reverse direction from the displacement terminal end position, the pressure fluid, which had been supplied to the first port 112, is supplied instead to the second port 114 while the first port 112 is placed in a state of being open to atmosphere. Thus, by supply of the pressure fluid from the second port 114 to the pair of through holes 116a, 116b, the pistons 120 are displaced in a direction to separate away from the rod holders 132 (in a direction in which the end plate 138 approaches the cylinder main body 102), so that the slide table 104 is displaced through the pistons 120 and the piston rods 122. In addition, by abutment of the end plate 138 constituting the slide table 104 against the end surface of the cylinder main body 102, the initial position is restored.

In this manner, with the second embodiment, similar to the first embodiment, in the linear actuator 100, using the magnetic attractive force of the permanent magnets 172a, 172b, a pressure can be applied diagonally or in an inclined direction to the balls 144 by the first curved surface 174a on the upper side of the guide grooves 146, 146 of the slide table 104, and by the second curved surface 176b on the lower side of the guide grooves 164, 164 of the guide mechanism 106, and therefore, with a simple structure, chattering/backlash between the slide table 104 and the guide mechanism 106 can be prevented, together with suppressing differential slippage of the balls 144 and achieving a reduction in scale of the linear actuator 100. Compared to a gothic arch structure or a circular structure, a high level of precision in machining accuracy and assembly accuracy of the balls 144, the guide grooves 146, 146 and the guide grooves 164, 164 is not required, and therefore, the process steps for machining and assembling the linear actuator 100 can be lessened.

Moreover, with the second embodiment, permanent magnets 172a, 172b are disposed on the guide mechanism 106, however, the permanent magnets 172a, 172b may also be disposed on the slide table 104. In this case, the permanent magnets 172a, 172b are disposed within a region of the slide table 104 confronting the guide mechanism 106. In such a case as well, since a downwardly directed force is applied to the slide table 104 by the magnetic attractive force of the permanent magnets 172a, 172b, a pressure can be applied to the balls 144 diagonally or in an inclined manner.

<Modifications>

Each of the embodiments described above may be modified in the following ways.

Figure 13:
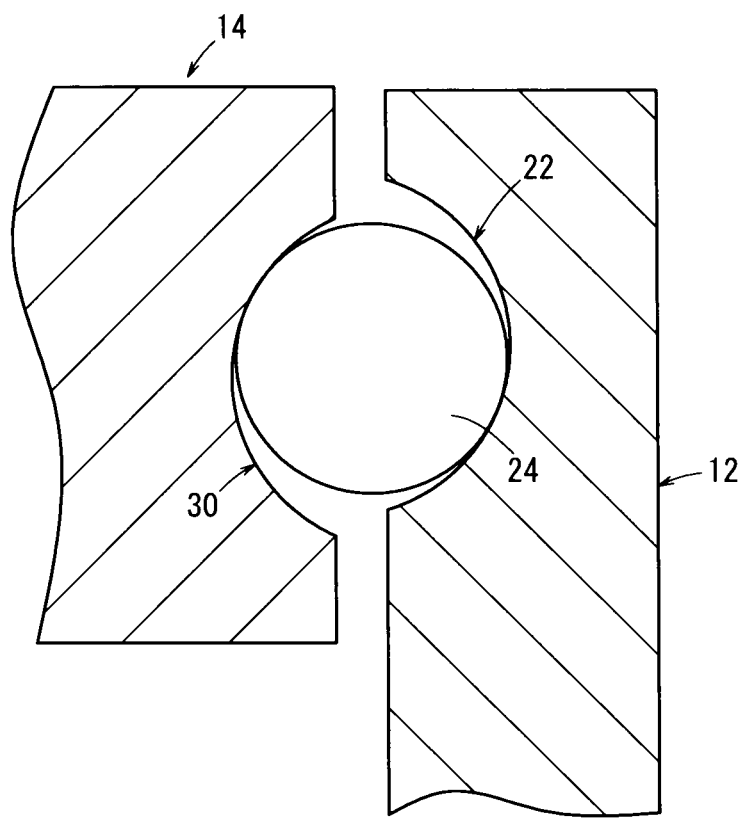
FIG. 13 is a view showing an example of a guide groove of a guide rail and a guide groove of a slide table according to a first modification.

(First Modification) In each of the aforementioned embodiments, the guide groove 22 and the guide groove 30, or the guide groove 146 and the guide groove 164, are formed by combining two respective arcs. However, the guide groove 22 and the guide groove 30, or the guide groove 146 and the guide groove 164, may also be grooves made up from a single arc. In this case as well, similar to the first and second embodiments, the guide groove 22 and the guide groove 30, or the guide groove 146 and the guide groove 164, are capable of applying a pressure to the balls 24, 144 diagonally or in an inclined manner, due to the magnetic attractive force from the permanent magnets 26a, 26b, or the permanent magnets 172a, 172b. Further, the structure of the grooves is simplified through use of a single arc, so that the number of assembly steps required to fabricate the grooves can be lessened. In this case, the single arc is defined as an arc having a radius of curvature, which is greater than that of the radii of the balls 24, 144. FIG. 13 shows an example of a case in which the guide grooves 22, 22 and the guide grooves 30, 30 in the above first embodiment are grooves made up from a single arc. As shown in FIG. 13, even though the guide groove 22 and the guide groove 30 are made up from a single arc, it can be understood that the guide groove 22 and the guide groove 30 are still capable of applying a pressure to the ball 24 diagonally or in an inclined manner.

(Second Modification) In each of the aforementioned embodiments, the guide groove 22 and the guide groove 30, or the guide groove 146 and the guide groove 164, are formed by combining two respective arcs. However, because the second curved surface 42b of the guide groove 30 and the first curved surface 40a of the guide groove 22, or the second curved surface 174b of the guide groove 146 and the first curved surface 176a of the guide groove 164, are not themselves used to apply pressure to the balls 24, 144, the machining precision of the second curved surface 42b and the first curved surface 40a, or the second curved surface 174b and the first curved surface 176a, can be comparatively low. Stated otherwise, the surfaces of the second curved surface 42b and the first curved surface 40a, or of the second curved surface 174b and the first curved surface 176a, may be kept rough. Consequently, the number of process steps required to fabricate the guide grooves can be lessened.

(Third Modification) In each of the aforementioned embodiments, although permanent magnets 26a, 26b and permanent magnets 172a, 172b have been used, in place of such permanent magnets, an electromagnet (magnet) 200 may also be used. Essentially, so long as a substance (magnet) is used, which is capable of generating a bipolar magnetic field having two poles, either of the permanent magnets 26a, 26b, 172a, 172b, or alternatively an electromagnet may be used. Further, in the present invention, conceptually, the term "magnets" may be understood to include any of permanent magnets 26a, 26b, 172a, 172b as well as electromagnets.

Figure 14:
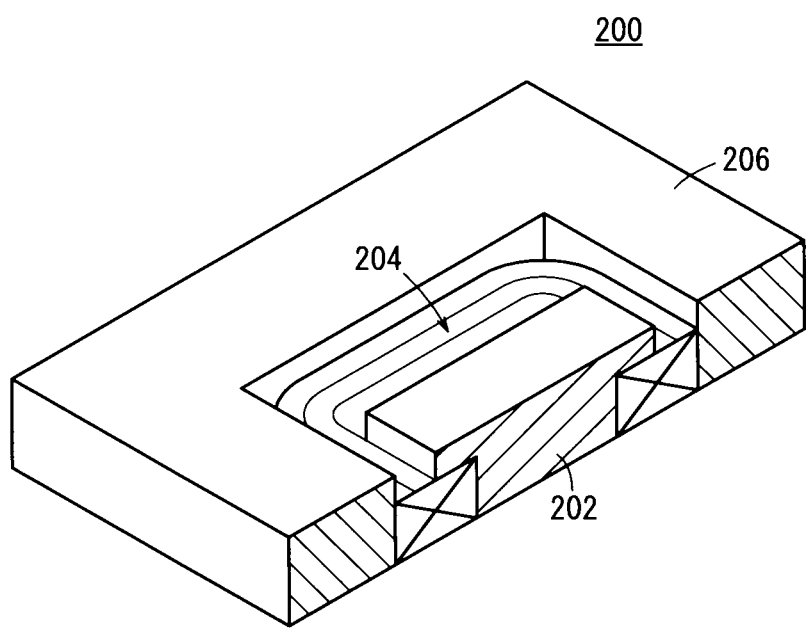
FIG. 14 is a partially cutaway perspective view of an electromagnet used in a third modification.

FIG. 14 is a partially cutaway perspective view of an electromagnet 200 used according to the third modification. The electromagnet 200 is constituted from an inner yoke 202 having a bobbin shape, a coil 204, which is wound around an outer circumference of the inner yoke 202, and an outer yoke 206 that surrounds the outer circumference of the coil 204. By using the electromagnet 200 in place of the permanent magnets 26a, 26b, 172a, 172b, the strength of the pressure applied to the balls 24, 144, or in other words, the intensity of the magnetic attractive force, can be adjusted. More specifically, by changing the magnitude of the current that flows through the coil 204 of the electromagnet 200, the intensity of the magnetic attractive force changes, and hence the strength at which pressure is applied to the balls 24, 144 from the first curved surface 42a of the guide groove 30 and the second curved surface 40b of the guide groove 22, or from the first curved surface 174a of the guide groove 146 and the second curved surface 176b of the guide groove 164, can be changed.

In the third modification, the electromagnet 200 includes the inner yoke 202 and the outer yoke 206. However, the electromagnet 200 may exclude the inner yoke 202 and/or the outer yoke 206. The electromagnet 200 may include a permanent magnet instead of the inner yoke 202. Also, a plurality of electromagnets 200 may be used.

(Fourth Modification) In the above first embodiment, although the magnetic attractive force is generated using two permanent magnets 26a, 26b (hereinafter the term "permanent magnets 26" is used as a collective term to refer to the permanent magnets 26a and 26b), as shown in FIGS. 15 through 18, the number and arrangement of the permanent magnets 26 may be changed in various ways.

FIGS. 15A through 15G are schematic drawings of a linear actuator 10 in which magnetic paths are provided along directions of the arrow A. FIG. 15A shows a linear actuator 10 in which a single plate-like permanent magnet 26 is disposed on a side of a slide table 14 confronting the guide rail 12, such that an S-pole of the permanent magnet 26 faces toward the slide table 14 and an N-pole of the permanent magnet 26 faces toward the guide rail 12. In this case, a magnetic flux and a magnetic attractive force are generated as shown in FIG. 15A.

FIG. 15B shows a linear actuator 10 in which yokes 210 are provided on opposite sides of the permanent magnet 26 along directions of the arrow A in the linear actuator 10 of FIG. 15A. In this case also, a magnetic flux and a magnetic attractive force are generated similar to that shown in FIG. 15A.

FIG. 15C shows a linear actuator 10 in which two permanent magnets 26 are disposed on a side of the slide table 14 confronting the guide rail 12, such that an S-pole of one of the permanent magnets 26 and an N-pole of the other of the permanent magnets 26 are placed on the side of the slide table 14. Stated otherwise, a case is shown in which the two permanent magnets 26 are magnetized vertically such that the polar orientations thereof are mutually opposite to each other, and the permanent magnets 26 are disposed on a side of the slide table 14 confronting the guide rail 12. The two permanent magnets 26 contact one another mutually along the direction of the arrow A. In this case, a magnetic flux and a magnetic attractive force are generated as shown in FIG. 15C.

FIG. 15D shows a linear actuator 10 in which four permanent magnets 26, which are magnetized vertically such that the polar orientations thereof are mutually opposite to each other, are disposed along directions of the arrow A on a side of the slide table 14 confronting the guide rail 12. In FIG. 15D, the adjacent permanent magnets 26 are disposed so as to be mutually in contact with each other. In this case, a magnetic flux and a magnetic attractive force are generated as shown in FIG. 15D.

FIG. 15E shows a linear actuator 10 in which, in place of the four permanent magnets 26 shown in FIG. 15D, a single plate-like permanent magnet 26 is disposed on a side of the slide table 14 confronting the guide rail 12, which is magnetized in multiple poles, and wherein respective magnetic poles thereof are mutually opposite to each other along directions of the arrow A. In this case as well, a magnetic flux and a magnetic attractive force are generated, which are the same as those shown in FIG. 15D.

FIG. 15F shows a linear actuator 10 in which three permanent magnets 26, which are magnetized in directions of the arrow A, are disposed on a side of the slide table 14 confronting the guide rail 12 along directions of the arrow A such that the magnetic polar orientations thereof are mutually opposite to each other. In FIG. 15F, yokes 210 are provided on opposite sides of each of the permanent magnets 26. In this case, a magnetic flux and a magnetic attractive force are generated as shown in FIG. 15F.

FIG. 15G shows a linear actuator 10 in which permanent magnets 26, which are magnetized vertically, and permanent magnets 26, which are magnetized horizontally (in directions of the arrow A), are arranged alternately along the directions of the arrow A, on a side of the slide table 14 confronting the guide rail 12, and in addition, wherein the polar orientations of adjacent permanent magnets 26 having the same magnetization directions, are opposite from each other. In other words, a linear actuator 10 is shown in which the permanent magnets 26 are arranged in the form of a Halbach array on a side of the slide table 14 confronting the guide rail 12. In this case, a magnetic flux and a magnetic attractive force are generated as shown in FIG. 15G.

FIGS. 16A through 16G are schematic drawings of a linear actuator 10 in which magnetic paths are provided along directions of the arrow B. The arrangements of the permanent magnets 26 in FIGS. 16A through 16G are basically the same as those shown in FIGS. 15A through 15G, except for the fact that the arrangement directions of the permanent magnets 26 are along directions of the arrow B, and not along directions of the arrow A, and thus further detailed explanations have been omitted.

FIGS. 17A through 17G are schematic drawings of a linear actuator 10 in which magnetic paths are provided along directions of the arrow A. The arrangements of the permanent magnets 26 in FIGS. 17A through 17G are basically the same as those shown in FIGS. 15A through 15G, except for the fact that the location where the permanent magnets 26 are disposed is not on the slide table 14, but rather on a side of the guide rail 12 that confronts the slide table 14, and thus further detailed explanations have been omitted.

FIGS. 18A through 18G are schematic drawings of a linear actuator 10 in which magnetic paths are provided along directions of the arrow B. The arrangements of the permanent magnets 26 in FIGS. 18A through 18G are basically the same as those shown in FIGS. 16A through 16G, except for the fact that the location where the permanent magnets 26 are disposed is not on the slide table 14, but rather on a side of the guide rail 12 that confronts the slide table 14, and thus further detailed explanations have been omitted.

(Fifth Modification) In the aforementioned second embodiment, although the magnetic attractive force was generated using two permanent magnets 172a and 172b (hereinafter the term "permanent magnets 172" is used as a collective term to refer to the permanent magnets 172a and 172b), similar to the above-described fourth modification, the number and arrangement, etc., of the permanent magnets may be changed. In a linear actuator 100 according to the fifth modification, the vertical arrangement of the linear actuator 10 of FIGS. 15 through 18 is reversed (in other words, the guide rail 12 is on an upper side, whereas the slide table 14 is on a lower side), and further, the guide rail 12 is taken to be the slide table 104, and the slide table 14 of FIGS. 15 through 18 is taken to be the guide mechanism 106.

(Sixth Modification) In each of the aforementioned embodiments, the first member (the guide rail 12, the slide table 104) and the second member (the slide table 14, the guide mechanism 106) both are made of magnetic materials. However, between the first member and the second member, at least one of such members on which the permanent magnets 26, 172 are not disposed may be made of a magnetic material. More specifically, in the case that the permanent magnets 26, 172 are disposed on the first member, at least the second member may be made of a magnetic material, and in the case the permanent magnets 26, 172 are disposed on the second member, at least the first member may be made of a magnetic material.

(Seventh Modification) Features of the aforementioned first through sixth modifications may arbitrarily be combined with each other.

Although certain preferred embodiments of the present invention have been shown and described in detail above, the technical scope of the present invention is not limited to the disclosed scope in the above-described embodiments. Various changes and improvements can be made to the aforementioned embodiments, which would be readily apparent to persons skilled in the art. It should be understood that such changes and improvements are included within the technical scope of the present invention, and may be made to the embodiments without departing from the scope of the invention as set forth in the appended claims.

What is claimed is:

1. A linear actuator for displacing a relative position between a first member and a second member, which is arranged in confronting relation to the first member, wherein:
   projections are formed on opposite end sides of the first member, the projections extending along a direction of displacement and projecting toward the second member;
   the second member is disposed between the projections on the opposite end sides of the first member, with rolling bodies that enable displacement of the relative position between the first member and the second member being interposed therebetween;
   first rolling grooves and second rolling grooves for rollably supporting the rolling bodies are provided on the projections on the opposite end sides of the first member and on the second member; and
   the first rolling grooves and the second rolling grooves apply, on the rolling bodies, a pressure caused by a magnetic attractive force of a magnet that generates a bipolar magnetic field having two poles, wherein
   with respect to the direction of displacement of the linear actuator, a range within which the magnetic attractive force is generated covers at least an entire range within which the rolling bodies are supported by the first rolling grooves and second rolling grooves,
   wherein a groove shape of at least one of the first rolling grooves and the second rolling grooves is made up of a plurality of arcs each having a different radius of curvature.

2. The linear actuator according to claim 1, wherein the magnets are permanent magnets or electromagnets.

3. The linear actuator according to claim 1, wherein a diameter of the rolling bodies is smaller than a space formed between the first rolling grooves and the second rolling grooves.

4. The linear actuator according to claim 1, wherein a groove shape of at least one of the first rolling grooves and the second rolling grooves is of an arcuate shape having a single radius of curvature.

5. The linear actuator according to claim 1, wherein the first member and the second member are magnetic bodies.

6. The linear actuator according to claim 1, wherein:
   a coil is disposed on either one of the first member and the second member;

the magnet is disposed on a side of another one of the first member and the second member on which the coil is not disposed; and a thrust force is generated by a current that flows in the coil, to thereby displace the relative position between the first member and the second member.

7. The linear actuator according to claim 1, wherein a cylinder main body is attached to one of the first member and the second member, and the magnet is disposed on one of the first member and the second member.

8. The linear actuator according to claim 1, wherein said magnet is configured to apply said magnetic force along a magnetic force direction, wherein each of said rolling bodies contacts said first and second rolling grooves at two contact points aligned along a line of contact, and wherein said magnetic force direction is inclined relative to said line of contact such that said pressure applied by said first and second grooves on said rolling bodies is inclined relative to said magnetic force direction.

9. The linear actuator according to claim 8, wherein said magnetic force direction is inclined at a 45 degree angle relative to said line of contact.

* * * * *